United States Patent [19]
Killat et al.

[11] Patent Number: 4,969,149
[45] Date of Patent: * Nov. 6, 1990

[54] SWITCHING NETWORK FOR A SWITCHING SYSTEM

[75] Inventors: Ulrich R. P. Killat, Hamburg; Johann E. W. Krüger, Quickborn, both of Fed. Rep. of Germany

[73] Assignee: U.S. Philips Corporation, New York, N.Y.

[*] Notice: The portion of the term of this patent subsequent to Jan. 2, 2007 has been disclaimed.

[21] Appl. No.: 379,504

[22] Filed: Jul. 13, 1989

[30] Foreign Application Priority Data

Jul. 14, 1988 [DE] Fed. Rep. of Germany ....... 3823878

[51] Int. Cl.[5] .................... H04Q 11/04; H04J 3/24
[52] U.S. Cl. ................................ 370/60; 370/94.1
[58] Field of Search .............. 370/58.1, 58.2, 58.3, 370/60, 60.1, 94.1, 61; 340/825.03, 826, 827, 825.79, 825.8

[56] References Cited

U.S. PATENT DOCUMENTS

| | | | |
|---|---|---|---|
| 4,771,419 | 9/1988 | Graves et al. | 370/60 |
| 4,782,478 | 11/1988 | Day, Jr. et al. | 370/60 |
| 4,817,083 | 3/1989 | Richards | 370/58.1 |

FOREIGN PATENT DOCUMENTS 0183592 6/1986 European Pat. Off. .

OTHER PUBLICATIONS

Y. S. Yeh, "The Knockout Switch: A Simple, Modular Architecture for High Performance Pocket Switching" IEEE J. on Sel. Areas Comm., vol. SAC-5, No. 8 10/87.

CCITT, Study Groups XVIII, Report R 58, Document AP 1X-143-E, Report to the IXth Plenary Assembly (Melbourne 1988).

*Primary Examiner*—Douglas W. Olms
*Assistant Examiner*—Alpus H. Hsu
*Attorney, Agent, or Firm*—William Squire

[57] ABSTRACT

The invention relates to a switching network for a switching system in which cells are transmitted in accordance with a time division multiplex method and the through-connection is effected by means of the routing information contained in the header of the cells. The blocks arriving at the switching node are temporarily stored in a queuing buffer until a free frame is available. A switching network should be configured in such a manner that the number of buffer spaces can become as small as possible and buffer spaces only need to be provided for data which are to be forwarded via the associated serving trunk. To this end, it is proposed to allocate a comparator to each offering trunk, the comparator comparing the address of the serving trunk with the routing information and the cells supplied in the offering trunk only being entered into the buffer store associated with the serving trunk in the case of a correspondence between routing information and stored address of this serving trunk.

16 Claims, 5 Drawing Sheets

SWITCHING NETWORK FOR A SWITCHING SYSTEM

CROSS REFERENCE TO RELATED APPLICATIONS

Of interest are co-pending applications Ser. No. 189,275 filed May 2, 1988 entitled "Method and circuit arrangement for controlling a switching network in a switching system in the name of W. Jasmer et al, now U.S. Pat. No. 4,891,802 and Ser. No. 283,419 filed Dec. 12, 1988 entitled switching network and switching network control for a transmission system in the name of V. R. Killet et al, both assigned to the assignee of the present invention.

BACKGROUND OF THE INVENTION

The invention relates to a switching network for a switching system in which cells are transmitted in accordance with a time division multiplex method, particularly asynchronous time division multiplex methods, and the through-connection of the cells in the switching facility is effected by means of the routing information contained in the header of the cells and which is configured in the manner of a space division multiplex switching network as bus system having offering trunks and serving trunks. In this arrangement, the offering trunks are preferably arranged row by row and the serving trunks column by column.

The proportion of data traffic to be transmitted is continuously increasing in communication networks. To handle the data traffic, separate switching systems have been built up for the data and the telephone traffic. Since the data rate of the data signals to be transmitted can assume a plurality of different values, it is difficult to combine data and telephone switching in one network node.

Within the context of the development of future integrated broadband networks, the question is being discussed which method is to be used for transmitting the digital or analog information—partially with a high bandwidth requirement—in digital networks. Packet switching has long been known, in which the (digital) information stream is divided into individual packets. Each packet contains additional information, among other things information on the destination (address), in addition to the user information. As a result, messages can be directed to a party involved in the connection on the basis of their packet addresses, which only requires transmission capacity when a message is actually to be transmitted.

Furthermore, circuit switching has long been known, which requires transmission capacity for the entire duration of the cell, independently of whether messages are being transmitted or not. Particularly in the case of the telephone network, two-way transmission paths are provided although generally only one of the two telephone subscribers is speaking.

The use of packet switching in data traffic has previously led to throughputs of the order of magnitude of 1,000 packets per second and more. 1,000 times this amount is already expected today for future services using the method of packet switching, for example in the case of video communication. To achieve such throughputs, the time-wasting handling of the protocols is separated from the actual through-connection process in fast packet switching and the packets are distributed to the transmission paths in accordance with their destination addresses. To accelerate the through-connection process in the switching networks, greatly simplified protocols are used which can be very rapidly interpreted. At the input of the switching node, the incoming data packets are processed in a non-centralized manner by being provided with an internal address information according to their destination, connected through the central switching network and then forwarded at the output without the internal address information.

"Draft Recommendation I" issued by the CCITT Study Commission XVIII describes the "Asynchronous Transfer Mode". In the synchronous transfer mode, a particular transmission channel is only identified by its separation in time from a synchronization word. In the asynchronous transfer mode, the respective channel is identified by the addresses (headers) of its packets (cells) and, in particular, the start of the cells can be recognized, so that the headers can be interpreted. For this purpose, flags or a lower-level synchronization structure is used which presupposes a constant cell length. An example of this is "asynchronous time division", in which synchronization words are inserted again and again as "dummy cells" into the bit stream.

Initially, hybrid configurations with a combination of "synchronous transfer mode" and "asynchronous transfer mode" should attain practical significance since the network operator would like to continue to use the already existing networks configured in accordance with the synchronous transfer mode as long as possible due to the high investment costs.

In the European patent application having the application number 0,183,592, a broadband switching system was proposed in which the message is split into cells which are transmitted via broadband transmission paths in accordance with an asynchronous time division multiplex method. The cells can exhibit equal or different lengths. The cells consist of user and of address information, the address information being accommodated in a so-called header. The number of bits of a cell is designated as its length, values of between 120 and 256 bits for the user information and 32 or 16 bits for the header being provided for this purpose in the standardization proposals. The time intervals in which cells are transmitted are called frames. In this connection, a frame can contain a valid cell or be empty. Between two subscribers of the broadband switching system, a "virtual connection" exists which is maintained by the fact that the cells transmitted by the subscriber devices are provided with unambiguous header identifications which enable the switching node to forward the cells correctly. The cells arriving from an incoming trunk at the switching node are transferred to an outgoing trunk with conversion of the header. Since two or more cells can arrive for the same output trunk during a frame, so-called queuing buffers must be provided in the switching node. In the queuing buffer, one or more of these cells are temporarily stored until a free frame is available for these.

Having regard to the queuing buffer arrangement, the switching nodes can be centrally buffered systems (as known, for example, from the European patent application having the application number 0 183 592) or non-centrally buffered systems. In centrally buffered systems, there is only one buffer in which each incoming trunk deposits its incoming cells and from which each outgoing trunk reads out again the cells intended for it. Systems having noncentralized buffering are distinguished with respect to whether cells are buffered exclusively on the input side (an embodiment of this is described, for example, in German Patent Application P No. 3,714,385.9) or whether the buffers are exclusively arranged upstream of the outgoing trunks (compare, for example, IEEE, B 10.2.1, 1987, "The Knockout Switch: A Simple, Modular Architecture for HighPerformance Packet Switching by J. S. Yeh et al) or whether these are systems with input and output buffering. This is also called switching network buffering if a buffer is allocated to each switching point of a switching matrix.

As is shown by the details above, the design of the switching network for a switching node of a broadband switching system requires tedious investigations and special considerations for taking into account the manifold relationships and their mutual interactions. In addition, it must be taken into account that the circuit technology for the switching networks considered is at the limits of present semiconductor switching times. In particular, performance bottlenecks can occur if several cells are simultaneously sent through the switching network of a switching system. The cells can influence each other if fewer links than necessary paths are available in the switching network. In this connection, two types of interaction are of particular significance: contention and congestion.

Two cells (or the circuits sending them out) are in contention with one another if the same circuit parts are to be used for the transmission. As a rule, one of the cells is then prioritized compared with the other one and the other cell must either wait or is lost.

In congestion, a cell V has to wait for a cell U to be processed, but at the same time cell U is not processed because there is contention between cell U and a third cell W. A normal queuing situation in a queuing buffer is thus not a contention situation as long as the first cell in the buffer is transmitted in each frame cycle. Congestion occurs only if this cell enters into contention and is not processed but as a result, at the same time, no other cell in this queuing buffer can be transferred either.

The concept of congestion is of importance for the evaluation of the performance of such systems. This is because if a queuing buffer which is not empty cannot be processed during one frame period, it can be imagined that, instead, an additional "virtual" cell is processed. The sum of virtual and real load then results in the total load carried by the system. In some switching networks, the virtual load can become almost as great as the real load. This mainly applies to switching networks which use input buffering.

In German Patent Specification No. 3,743,685.6, a switching network having input buffering has been proposed which is configured of a bus system having offering trunks arranged row by row and serving trunks arranged column by column in the manner of a space division multiplex switching network. For evaluating the information items contained in the header, each switching point is provided with its own evaluating logic. At the input of each switching point, an input buffer is provided which receives and stores the cells supplied via the offering trunk until they reach one of the serving trunks. The number of input buffers corresponds to the number of serving trunks. The frames received by the subscriber or by the preceding switching node are located right-justified in the input buffer. A comparator allocated to each switching point is used for comparing the address, stored in a store, of the serving trunks arranged column by column with the routing information contained in the header and stored in a shift register. For this purpose, the shift register is connected, on the one hand, to the comparator and, on the other hand to the switching point on the output side of the buffer store. To each of the serving trunks a decision circuit is allocated which determines the order of offering trunks to be connected through in the case of identical routing information items. The order is determined by the spatial arrangement of the offering trunks, in which arrangement each decision circuit cyclically polls all comparators allocated to it.

In this switching facility, the buffer stores allocated to a serving trunk contain data which are not intended for this serving trunk. With a number of n serving trunks, an average of $(n-1/n) \times 100\%$ of all buffer spaces are unnecessarily occupied with data in this manner. These buffer spaces, however, must be available, which is why considerably more buffer space must be provided than would actually be required.

SUMMARY OF THE INVENTION

The invention is based on the object of improving a switching network of the type initially mentioned in such a manner that the number of buffer spaces are considerably reduced and buffer spaces only need to be provided for data which are to be forwarded via the associated serving trunk.

According to the invention, this object is achieved by a switching network for a switching system in which cells are transmitted each in accordance with a time division multiplex, particularly asynchronous time division multiplex, the cells each including a header containing routing information for that cell, and the through-connection of the cells is effected by means of the routing information contained in the header of the cells and which through-connection is configured in a space division multiplex switching network as a bus system having offering trunks and serving trunks, characterized in that buffer stores are provided between the offering trunks and the serving trunks and a comparator is allocated to each offering trunk, in which arrangement the comparator compares the address of the serving trunk with the routing information and the cells supplied on the offering trunk are only read into the buffer store associated with this serving trunk in the case of correspondence between routing information and stored address of the serving trunk, and in which arrangement, in the case of a multiple correspondence between address and routing information, the order in which the buffer stores are read out is determined by means of a decision circuit having the features of claim 1.

Further developments of the invention are specified in the subclaims.

IN THE DRAWING

In the text which follows, the invention and its developments will be explained with reference to the illustrative embodiments diagrammatically shown in FIGS. 1 to 6.

DETAILED DESCRIPTION OF THE PREFERRED EMBODIMENT

Figure 1:
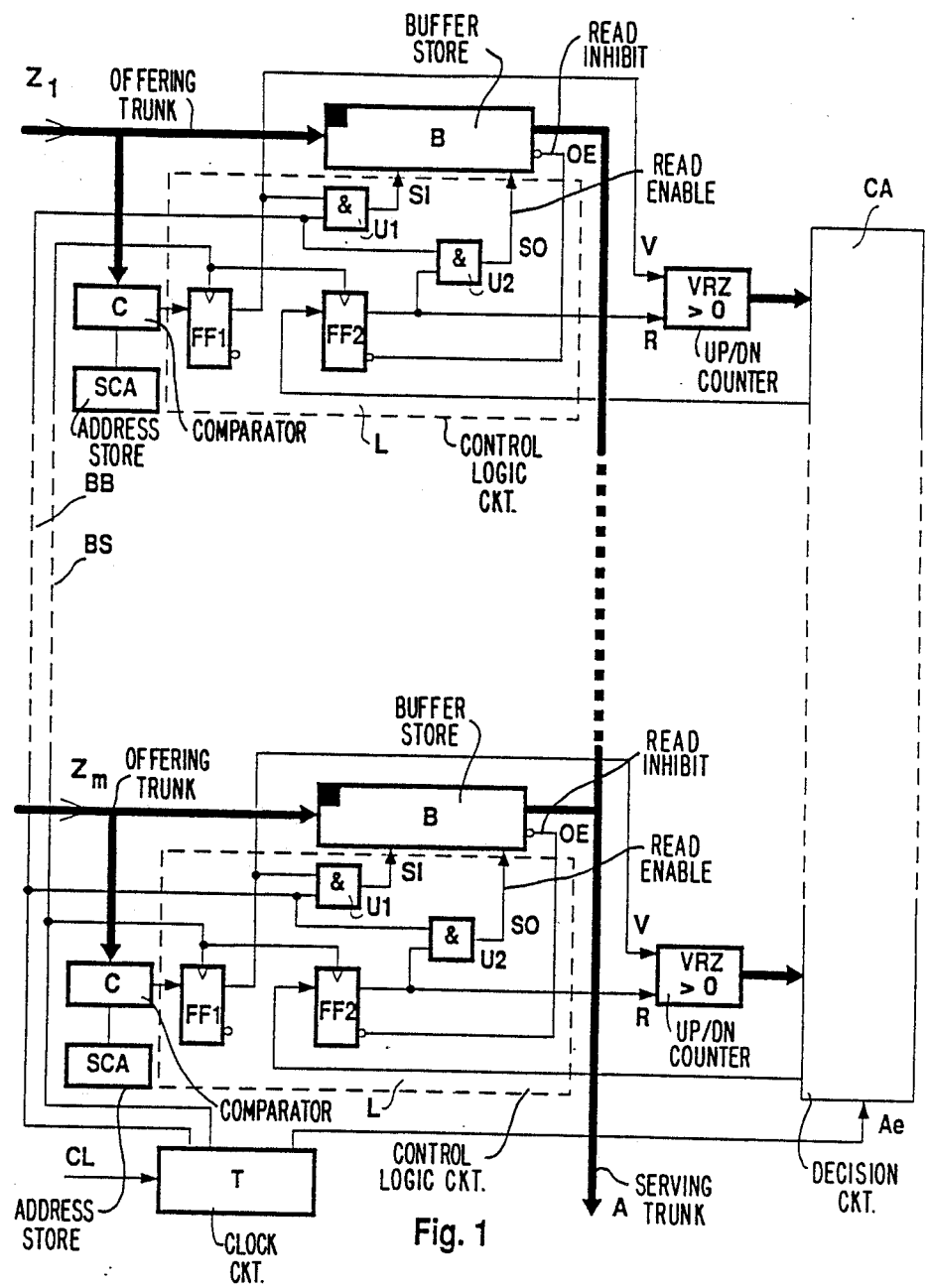
FIG. 1 shows an embodiment of a constructional unit for a switching network.

FIG. 1 shows an embodiment of a constructional unit for a switching network with buffer stores B. m offering trunks Z1 . . . Zm can be connected to the input of the constructional unit. The cells arriving on these trunks can be forwarded to a serving trunk A. The constructional unit can be advantageously also used as concentrator since it is capable of concentrating the data streams of m offering trunks to a single trunk. Each offering trunk Z1 . . . Zm is connected to a comparator C and a buffer store B. The outputs of the buffer stores B are all connected to the serving trunk A of this constructional unit. The clock circuit T is used for generating the clock signals necessary for the timing of the constructional unit from an input clock CL. It is assumed that the incoming cells are synchronized with the input clock C1 or with the cell start signal BS extracted from this clock. The comparison inputs of the comparators C are in each case connected to an address store SCA in which the address of the associated serving trunk A is stored. The bit pattern identifying the address of the serving trunk A is identical for all comparators.

The buffer store B is connected to a control logic circuit L. Circuit L includes a first flip flop FF1 and a first AND gate U1. The set input of the flip flop FF1 is connected to the output of the comparator C, the clock input of the flip flop FF1 is supplied with a cell start signal BS generated in the clock generator circuit T. The output of the flip flop FF1 is connected to the upcounting input V of the up/down counter VRZ, the output signal of which is supplied to the decision circuit CA. Furthermore, the non-inverting output of the flip flop FF1 is connected to a first input of the first AND gate U1. A cell synchronizing signal BB generated in the clock circuit T is applied to the second input of the AND gate U1. The output of the first AND gate U1 is connected to the write control input of the input buffer B. The control logic circuit L also contains a second flip-flop FF2 and a second AND gate U2. The first input of the AND gate U2 is also supplied With the cell synchronizing signal BB whilst the clock input of the flip-flop FF2 is supplied with the cell start signal BS. The non-inverting output of the second flip-flop FF2 is connected to the second input of the AND gate U2 and to the down-counting input R of the up/down counter VRZ. The output of the second AND gate U2 is connected to the input of the buffer store B via which the reading of the buffer store can be enabled (read control input). The inverting output of the flip-flop FF2 is connected to an input of buffer store B via which the reading of the buffer store can be inhibited (read inhibit input).

For the operation of the circuit arrangement, it shall be initially assumed that the date on the offering trunks Z1 . . . Zm are all synchronized to the cell start. Each comparator C continuously compares the data arriving on the associated offering trunk with the address for the serving trunk A stored in the store SCA. Synchronized with the cell start signal BS on the occurrence of the routing information, the result is stored in the first flip-flop FF1. If the routing information corresponds with the address of the serving trunk A, stored in the store SCA, the first AND gate U1, at which, at the same time, the cell synchronizing signal BB supplied by the clock circuit T is present, opens due to the significant state then existing at the non-inverting output of the first flip-flop FF1. As a result, the write signal SI is generated which has the effect that the data arriving on the offering trunk are written into the buffer store B. At the same time, the counter VRZ is incremented with the output signal of the first flip-flop FF1. The counter VRZ is constructed as up/down counter in the preferred embodiment shown in FIG. 1. The output signal of the counter VRZ is supplied to an input of the decision circuit CA. This decision circuit CA regulates the order in which the buffer stores B can transmit the data stored in them to the serving trunk A.

If the decision circuit CA decides, for example, that the data delivered by the offering trunk Z1 are to be read out of the associated buffer store B, it outputs a corresponding signal to the associated second flip flop FF2. The significant state then existing at the non-inverting output of the flip flop FF2 is present at the AND gate U2 whose second input is also supplied with the cell synchronizing signal BB. As a result, the second AND gate U2 is enabled and outputs a read signal SO to the buffer store B which thereupon outputs the data stored in it to the serving trunk A. In the meantime, a read inhibit signal OE output by the inverting output of the in each case associated second flip flop FF2 is present at the remaining buffer stores B of this constructional unit which are connected to the offering trunks Z2 . . . Zm, so that these buffer stores are not read. The output signal of the flip flop FF2 present at the down-counting input R of the counter VRZ resets the counter VRZ as soon as the buffer store B is activated.

Thus, the decision circuit CA is operating with the counts of the counters VRZ. Allocation of the serving trunk A can occur in various manners depending on the type of counter information.

A first advantageous development consists in the fact that the counter VRZ only outputs a signal which indicates that the count is greater than zero. A signal at the output of the counter which indicates that the count is equal to zero is not especially evaluated. It is then possible to achieve that the buffer stores in which messages are stored can cyclically transmit a cell to the serving trunk A.

Figure 2:
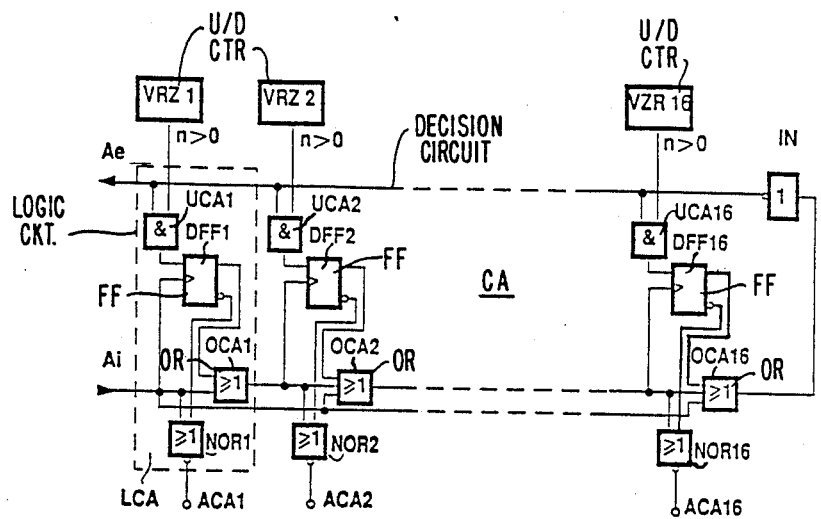
FIG. 2 shows an embodiment of a decision circuit.

An embodiment of a decision circuit CA suitable for this purpose, for a switching network for sixteen input trunks is shown in FIG. 2. Such a decision circuit CA is composed of individual logic circuits LCA of identical construction, one such logic circuit each being connected to the output of a respective counter VRZ1-16. The logic circuit LCA associated with the counter VRZ1 includes an edge-triggered D-type flip flop DFF1 the D input of which is connected to the output of an AND gate UCA 1, the output of the counter VRZ1 constructed as up/down counter in each case being connected to the first input of this AND gate UCA1. The inverting output of this D-type flip flop DFF1 is connected to a NOR gate NOR1 and the non-inverting output of this D-type flip flop DFF1 is connected to an OR gate OCA1. The outputs of the NOR gates form the outputs ACA1, ACA2 . . . of the decision circuit CA and are connected to corresponding inputs of the control logic circuits of the buffer stores of the circuit arrangement shown in FIG. 1. Since the clock inputs of the D-type flip flops DFF2 . . . DFF16 are in each case connected via an OR gate to the non-inverting output of the preceding D-type flip flop DFF1 ... DFF15 in each case, the individual D-type flip flops can be considered as being connected in series.

At a first clock input of the decision circuit CA, a series switching signal Ai generated in the clock circuit T is present. A positive edge of Ai is generated after the results of the comparators C (FIG. 1) have been transferred into the up/down counters VRZ. The signal Ai is supplied to one input of all OR gates OCA1 to OCA16 in the decision circuit CA and, in addition, to the clock input of the first D-type flip flop DFF1. The output signal occurring at an output of the decision circuit CA and output by the output of the OR gate OCA16 is fed back, with interposition of an inverter IN, to a further input of the decision circuit CA as series switching signal AE and is present at the second inputs of the AND gates U1 ... U16. In addition, it can be fed to other decision circuits in the switching system.

In the text which follows, the operation of the decision logic described above will be explained in greater detail.

It is assumed that a cycle has just been executed and the new input information from the up/down counters VRZ1...VRZ16 is present at the inputs of the decision circuit. The series switching signal Ai exhibits the significant logic state "LOW" and all D-type flip flops DFF1...DFF16 have stored this significant logic state "LOW". Thus, a series-switching signal Ae having the significant logic state "HIGH" is present at each second input of the AND gates UCA1 ... UCA16 and the AND gates are enabled when the associated counters exhibit the output state of greater than zero.

If then a positive edge occurs in the series switching signal Ai, this signal passes through the decision circuit CA with a gate delay caused by the transit time in the OR circuit OCA16 and the input data are transferred into the D-type flip flops DFF1...DFF16 so that each flip flop, the associated counter of which had an output state of greater than zero, now has the significant state "HIGH" at its non-inverting output. After the delay through the inverter IN, the series switching signal Ai goes to the significant logic state "LOW" and all AND gates UCA1 to UCA 16 are disabled. After a period which is sufficient for clocking a D-type flip flop, the series switching signal Ai changes to the significant logic state "LOW". This negative edge passes through the chain of OR gates to the first D-type flip flop which has stored the "HIGH" state. It has the effect that the output signal at the inverting output of the D-type flip flop is switched through to the respective output ACA via the associated NOR gate. This output signal at ACA causes the data stored in the associated buffer store B to be read out to the serving trunk A via the second flip flop FF2 in the circuit shown in FIG. 1. At the same time, the relevant D-type flip flop inhibits the D-type flip flops following in the series circuit by means of the significant state "HIGH" present at its non-inverting output since the "HIGH" state is retained after the OR gate. After the data have been read out of the activated buffer store, a new positive edge of the series switching signal Ai is generated in the clock circuit. As a result, the D-type flip flop, which still exhibited the significant state "HIGH" is reset and assumes the significant logic state "LOW". If then the series switching signal Ai again assumes the significant logic state "LOW", the next buffer store, the associated D-type flip flop of which has stored the significant logic state "HIGH", can be read out. The cycle thus described runs until the last D-type flip flop of the series circuit which exhibited the significant logic state "HIGH" has been reset. Input data can then again be transferred into the D-type flip flops DFF1 ... DFF16 with the next positive edge of the series switching signal Ai. This edge falls into the fixed pattern of positive edges of the series switching signal Ai.

With a uniform distribution of the traffic volume of a serving trunk over all offering trunks, the method which can be carried out by means of this embodiment of the decision circuit can be considered to be optimum. In practice, however, the uniform distribution of the traffic volume over the offering trunks will be the exception rather than the rule. Instead, it must also be expected, due to the asynchronous nature of the cell generation, that due to instantaneous traffic peaks on a few offering trunks Z, the associated buffer stores B will be caused to overflow. This risk can be countered by reading the corresponding buffer stores more frequently than those with less loading. The corresponding buffer stores then appear to have a greater capacity for the incoming packet stream.

Figure 3:
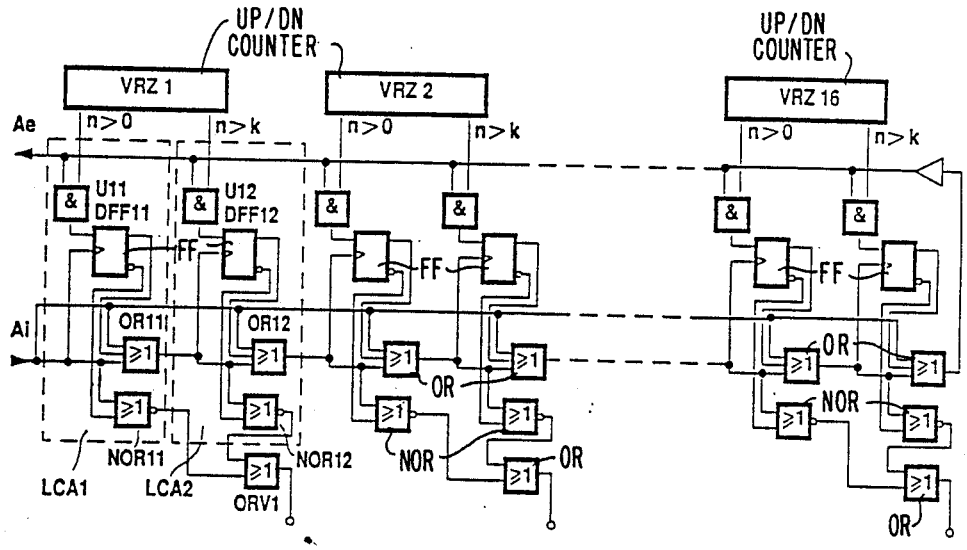
FIG. 3 shows another embodiment of a decision circuit.

FIG. 3 shows an embodiment of a decision circuit in which the buffer stores subjected to a higher loading can be read more frequently. In this arrangement, it is provided that an additional threshold criterion is evaluated in such a way that it is not only a count equal to zero or greater than zero which is evaluated but also a count n which is greater than a predeterminable threshold value k. For this purpose, each of the up/down counters VRZ1 ... VRZ16 has two outputs, each of which acts on a logic circuit in the decision circuit.

In principle, the operation and the configuration of a logic circuit, of which the decision circuit shown in FIG. 3 is constructed, corresponds to the operation of a logic circuit LCA such as has been described in connection with the decision circuit shown in FIG. 2.

The decision circuit also exhibits series connected edge-triggered D-type flip flops, the D input of these D-type flip flops in each case being connected via an AND circuit to an output of one of the up/down counters and the non-inverting output of these D-type flip flops being connected to an OR gate and the inverting output being connected to a NOR gate. One unit comprising a D-type flip flop, an AND gate, an OR gate and a NOR gate is in each case combined to form a logic circuit, the logic circuit LCA1 being associated with the first output (n greater than zero) and the logic circuit LCA2 being associated with the second output (n greater than k) of the counter VRZ1. The outputs of the two logic circuits associated with the outputs of one of the up/down counters are combined via an OR gate, the OR gate ORV1 in the case of the logic circuits LCA1 and LCA2 associated with the counter.

Due to the fact that an additional signal from each counter is taken into consideration, a buffer store meeting the condition n greater than k will be able to transmit two cells to the serving trunk A before the state of the next buffer store is interrogated. An even greater consideration of the different loading on individual buffer stores can be effected by the fact that further threshold criteria are included in the decision. In addition, several of the logic circuits LCA described above can be connected in parallel to an output of a counter VRZ having an output signal n greater than k so that the number of accesses to the output trunk can be increased in this manner. It is also possible to select a different value for the threshold value k for each of the offering trunks so that static priorities can be issued in this manner.

The significant state of the flip flop FF2, which, as read signal, activates the buffer store via the AND gate U2 in the circuit arrangement shown in FIG. 1, resets the counter VRZ via the input R. After the data have been read out of an activated buffer store, the D-type flip flop which just had the "HIGH" state is reset by the positive edge of the series switching signal Ai by entering the "LOW" state of the series switching signal Ae. So that the next buffer store, the associated D-type flip flop of which in the decision circuit exhibits the significant "HIGH" state, can be read out, the negative edge of the pulse of the series switching signal of Ai must pass through the entire chain of the preceding OR gates. The read process is delayed by the summing together of the individual gate transit times. It must therefore be attempted to reduce these transit times and, as a result, to accelerate the read processes.

Figure 4:
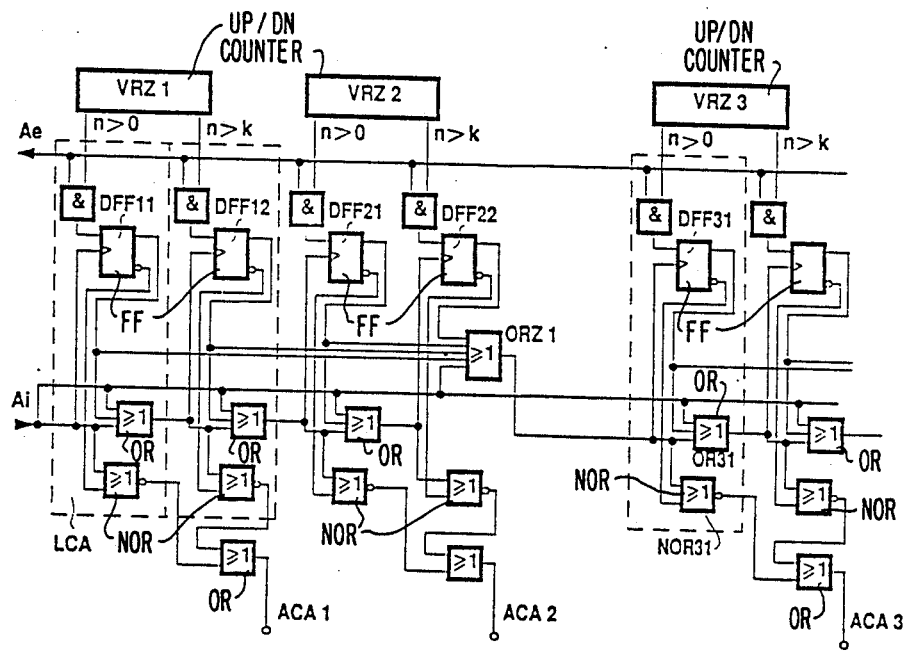
FIG. 4 shows another example of an embodiment of a decision circuit.

An embodiment of a decision circuit in which such a reduction in transit time has been achieved is shown in FIG. 4. In this arrangement, too, each output of an up/down counter is associated with a logic circuit LCA comprising a D-type flip flop, an AND gate, an OR gate and a NOR gate in the configuration already described in connection with FIG. 2. The outputs of the logic circuits, associated with the outputs of a counter, are also connected via an OR gate to an associated output ACA1 and so forth. To improve the clarity of the arrangement, the corresponding reference symbols have been omitted in FIG. 4 in as much as they have not been mentioned in the text following. In distinction from the circuit arrangement shown in FIG. 3, the non-inverting outputs of the D-type flip flops of four adjacent logic circuits in each case are connected in groups to the inputs of one OR circuit in each case. This OR circuit exhibits a further input which is supplied with the series stepping signal Ai. In the illustrative embodiment, the non-inverting outputs of the D-type flip flops DFF11, DFF12, DFF21, DFF22 associated with the two counters VRZ1 and VRZ2 are connected to the inputs of the OR gate ORZ1. If all D-type flip flops exhibit the significant state "LOW", the negative edge of the series stepping signal Ai only needs to pass through the OR circuit ORZ1 and is therefore only delayed by this gate transit time in this circuit. This gate transit time is that of the OR gate ORZ1. In this manner, the maximum number of gate transit times is given by:

Number of groups plus the number of flip flops per group—2. This number reaches a minimum when the number of groups becomes equal to the number of D-type flip flops per group.

Figure 5:
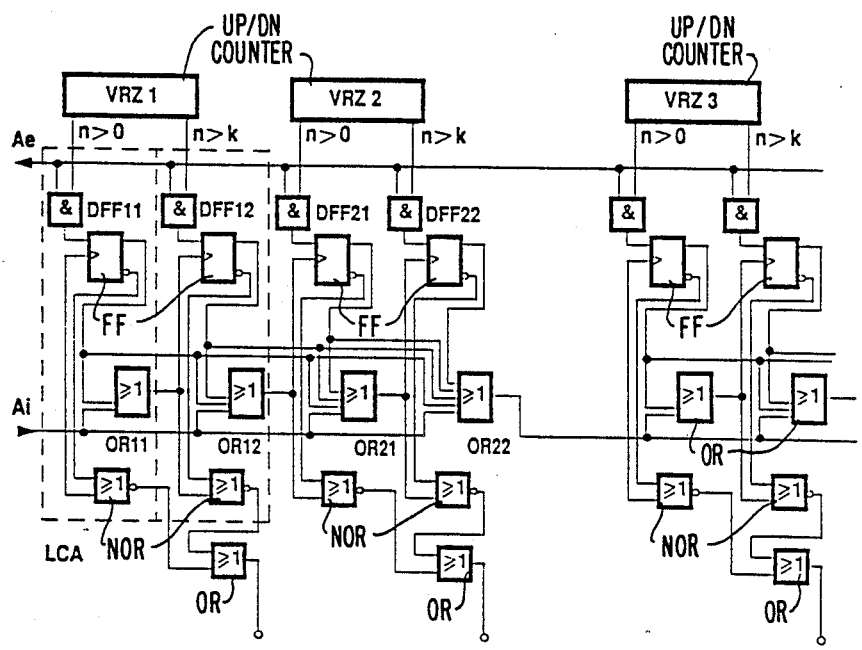
FIG. 5 shows another example of an embodiment of a decision circuit.

Another embodiment of a decision circuit having shortened gate transit times is shown in FIG. 5. This decision circuit is also built up from individual logic assemblies LCA having in each case a D-type flip flop, an AND gate, an OR gate and a NOR gate in the configuration essentially already described in connection with FIG. 3. The logic circuits LCA associated with the outputs of a counter are also ored via an OR gate. The non-inverting outputs of the D-type flip flops are also combined into groups. Having regard to the description already given in connection with FIG. 3, only components being specially mentioned in the text which follows are provided with reference symbols in FIG. 5 for reasons of clarity.

In the embodiment of a decision circuit shown in FIG. 3, the non-inverting outputs of the D-type flip flops are in each case connected to one input of the OR circuit in the same logic circuit. In the embodiment shown in FIG. 5, the non-inverting outputs of the D-type flip flops are additionally also connected to in each case one input of the subsequent OR circuits of a group. Thus, the non-inverting output of the D-type flip flop DFF11 is connected both to the OR circuit OR11 and to in each case one input of the OR circuits OR12, OR21 and OR22 following in the sequence in the further logic circuits of the group belonging to the two counters VRZ1 and VRZ2. Thus, for example, the significant state at the output of the first D-type flip flop DFF11 of this group is directly available at the last OR gate OR22 of the same group. The transit time within one group corresponds to the transit time in one gate. For this reason, all flip flops can also be combined in accordance with this pattern to form one group having only one gate transit time delay for the Ai signal.

Figure 6:
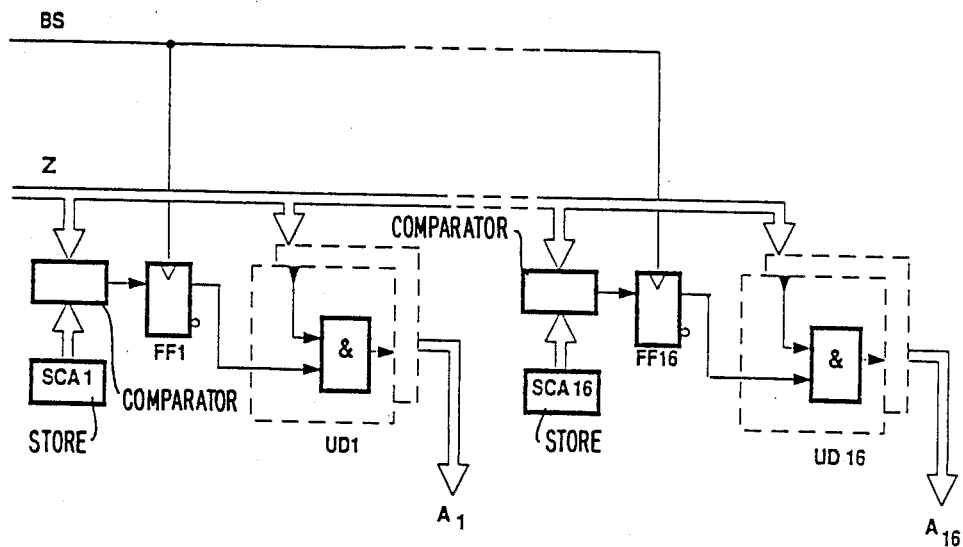
FIG. 6 shows an illustrative embodiment for a distribution arrangement.

As has already been initially stated, a constructional unit shown in FIG. 1 can be advantageously used as concentrator. This effects a concentration of the data streams from m trunks to one output trunk. For the opposite direction, a further constructional unit is then needed which allows the data coming from an input trunk to be switched to n output trunks in accordance with their routing information. This corresponds to a demultiplexer function. A circuit arrangement suitable for this purpose is shown in FIG. 6. The data arriving on an offering trunk Z are offered to several switches (AND gates UD1 ... UD16). The AND gates switch the data to the output trunks A1 ... A16 in dependence on the value of the values, stored in the associated flip flop FF1 ... FF16, of the comparison between the routing information and the addresses of the output trunks A1 ... A16 stored in the stores SCA1 ... SCA16, carried out in the comparators C.

What is claimed is:
1. Switching network for a switching system in which cells are transmitted each in accordance with time division multiplex, particularly asynchronous time division multiplex, said cells each including a header containing routing information for that cell and the through-connection of the cells is effected by means of the routing information contained in the header of the cells and which through-connection is configured as a space division multiplex switching network bus system having offering trunks and serving trunks, characterized in that buffer stores are provided between the offering trunks and the serving trunks and a comparator is allocated to each offering trunk, in which arrangement the comparator compares the address of the serving trunk with the routing information and the cells supplied on the offering trunk are only read into the buffer store associated with this serving trunk in the case of correspondence between routing information and stored address of the serving trunk, and in which arrangement, in the case of a multiple correspondence between address and routing information, the order in which the buffer stores are read out is determined by means of a decision circuit.

2. Switching network according to claim 1, characterized in that each buffer store is associated with a counter which is supplied with the result of the comparison between routing information and address of the serving trunk determined by the comparator and in that the outputs of the counters are connected to the decision circuit which determines the order in which the buffer stores are read by means of the output values of the counters.

3. Switching network according to claim 2, characterized in that the counters as up/down counters.

4. Switching network according to claim 2, characterized in that each comparator is connected to a first flip flop, the clock input of which is supplied with a cell start signal generated in the switching network and the output of which is connected to an input of the counter and to one input of a first AND gate, at the second input of which a cell synchronizing signal generated in the switching network is present, the output of the first AND gate being connected to a control input of the buffer store.

5. Switching network according to claim 4, characterized in that a further flip flop (FF2) is provided which is connected to an output of the decision circuit (CA) and the clock input of which is supplied with the cell start signal (BS) and the output of which is connected via a further AND gate (U2), at which the cell synchronizing signal (BB) is also present, to a further input of the buffer store (B) via which the reading of the buffer store can be enabled.

6. Switching network according to claim 5, characterized in that the further flip flop is connected at the output to a further input (R) of the counter.

7. Switching network according to claim 2, characterized in that each counter is associated with at least one logic circuit which controls the reading of the associated buffer store in dependence on the value of the count output of the counter connected to it.

8. Switching network according to claim 7, characterized in that the decision circuit includes a plurality of logic circuits, each logic circuit of a decision circuit including a flip flop, the input of which is connected via and AND gate to the associated counter and the output of which is connected to an OR circuit and to a NOR circuit.

9. Switching network according to claim 8, characterized in that the clock input of a first flip flop, one input of a first OR circuit and one input of a last OR circuit and one input of a first NOR circuit of the decision circuit are supplied with a first series stepping signal generated in the switching network and in that the OR circuits are in each case, except one connected at its output to one input of a following OR circuit, the except one OR circuit outputting a second series stepping signal which is supplied to an input of each of the AND circuits.

10. Switching network according to claim 7, characterized in that said counters exhibit more than one output, a signal being present at a first output when the count is greater than zero and a signal being present at a further output when the count is greater than a predeterminable, threshold value, and in that each output of each said counters is associated with one logic circuit, the latter having an AND gate, a flip flop, an OR circuit and a NOR gate, and the outputs of the logic circuits allocated to a counter are connected via an OR circuit to the control logic circuit for the associated buffer store.

11. Switching network according to claim 10, characterized in that more than one logic circuit is connected to a further output of a counter at which a signal is present when the count exhibits a value which is greater than a predeterminable threshold value.

12. Switching network according to claims 9, characterized in that the logic circuits of a decision circuit form groups, each group comprising several logic circuits, the flip flops of a group being connected at a group output to an OR circuit which has a further input to which the series stepping signal (Ai) is connected and which is connected at the output to the clock input of a flip flop circuit and to the OR circuit and to the NOR circuit of a subsequent logic circuit.

13. Switching network according to claims 9, characterized in that the logic circuits of a decision circuit form groups, each group comprising several logic circuits, the flip flop of a group, with the exception of one flip flop being connected at a group output to one input of a further OR circuit of this group following a first Or circuit of this group, the series stepping signal being applied to a further input of each of the latter OR circuits of a group and the output of a last OR circuit of a group being connected to the input for the series stepping signal of a next group.

14. A switching network for a switching system in which cells are transmitted by asynchronous time division multiplexing, said cells having headers containing routing information for through connection of the cells, said through connection comprising a space division multiplex switching network bus system having offering trunks and serving trunks, said switching network comprising:

a plurality of buffer stores adapted to be coupled between a plurality of offering trunks and a given serving trunk, each store corresponding to a different offering trunk and for storing the address of said given serving trunk;

comparison means for comparing the address of the given serving trunk with the routing information of a cell on a corresponding offering trunk;

means responsive to said comparison means for reading a cell supplied on an offering trunk into the buffer store corresponding to that offering trunk when the routing information of that cell corresponds to the address of the given serving trunk; and means for selectively reading out said cells from said stores to said serving trunk in a given order when a plurality of said read cells are addressed to said given serving trunk.

15. The switching network of claim 14 wherein said means for selectively reading out said cells includes counting means responsive to said comparison means for generating a stored cell count signal of different values and means responsive to the count signal for determining the order of the reading out of said cells from said buffer stores in accordance with a count signal value.

16. The switching network of claim 15 wherein said counting means includes logic means coupled to said comparison means for reading a cell into a corresponding store, said means for determining the order including further logic means for reading out said cells in accordance with a value of said count signal.

* * * * *